US010788687B2

(12) United States Patent
Taurel et al.

(10) Patent No.: US 10,788,687 B2
(45) Date of Patent: Sep. 29, 2020

(54) SYSTEM FOR TRANSDUCTION OF DISPLACEMENT TO OPTICAL PHASE SHIFT

(71) Applicant: COMMISSARIAT A L'ENERGIE ATOMIQUE ET AUX ENERGIES ALTERNATIVES, Paris (FR)

(72) Inventors: Boris Taurel, Montbonnot-Saint-Martin (FR); Laurent Duraffourg, Voiron (FR); Pierre Labeye, Grenoble (FR)

(73) Assignee: COMMISSARIAT A L'ENERGIES ALTERNATIVES, Paris (FR)

( * ) Notice: Subject to any disclaimer, the term of this patent is extended or adjusted under 35 U.S.C. 154(b) by 19 days.

(21) Appl. No.: 16/193,609

(22) Filed: Nov. 16, 2018

(65) Prior Publication Data
US 2019/0155065 A1      May 23, 2019

(30) Foreign Application Priority Data

Nov. 20, 2017      (FR) ...................................... 17 60929

(51) Int. Cl.
  *G02F 1/01*        (2006.01)
  *G02F 1/225*       (2006.01)
        (Continued)

(52) U.S. Cl.
  CPC ....... *G02F 1/0134* (2013.01); *G01B 9/02051* (2013.01); *G01D 5/266* (2013.01); *G01D 5/35306* (2013.01); *G02B 6/35* (2013.01); *G02B 26/06* (2013.01); *G02F 1/011* (2013.01); *G02F 1/225* (2013.01); *G02F 2001/212* (2013.01); *G02F 2201/307* (2013.01); *G02F 2203/50* (2013.01)

(58) Field of Classification Search
  CPC ........ G02F 1/0134; G02F 1/225; G02F 1/011; G02F 2001/212; G02F 2201/307; G02F 2203/50
  See application file for complete search history.

(56) References Cited

U.S. PATENT DOCUMENTS

| 5,284,544 A | * | 2/1994 | Mizutani | ........... | H01J 37/32357 |
| | | | | | 156/345.38 |
| 10,050,704 B1 | * | 8/2018 | Yap | ....................... | H01S 5/0687 |

(Continued)

FOREIGN PATENT DOCUMENTS

WO    WO 2012/155284 A1    11/2012

OTHER PUBLICATIONS

U.S. Appl. No. 15/660,25, filed Jul. 26, 2017, 2018/0039024 A1, Salim Boutami, et al.

(Continued)

*Primary Examiner* — Thomas A Hollweg
*Assistant Examiner* — Mary A El-Shammaa
(74) *Attorney, Agent, or Firm* — Oblon, McClelland, Maier & Neustadt, L.L.P.

(57) ABSTRACT

An optomechanical system including a guide structure, to guide a light beam; and two waveguide segments. Each guide structure include beams that together form two combs partially nested one in the other. At least one beam is free to move in translation along an axis orthogonal to the long axis of the guide structure. A displacement into an optical phase shift, while limiting additional effects on the intensity.

14 Claims, 6 Drawing Sheets

(51) Int. Cl.
*G02B 6/35* (2006.01)
*G01D 5/353* (2006.01)
*G01D 5/26* (2006.01)
*G02B 26/06* (2006.01)
*G01B 9/02* (2006.01)
*G02F 1/21* (2006.01)

(56) References Cited

U.S. PATENT DOCUMENTS

| | | | | |
|---|---|---|---|---|
| 10,132,957 B2* | 11/2018 | Hentz | | G01D 5/266 |
| 10,280,073 B2* | 5/2019 | Ludurczak | | B81B 7/02 |
| 2002/0021853 A1* | 2/2002 | Nakazawa | | G02F 1/125 |
| | | | | 385/7 |
| 2005/0151061 A1* | 7/2005 | Ogura | | B82Y 10/00 |
| | | | | 250/214.1 |
| 2011/0007383 A1* | 1/2011 | Gheorma | | G02F 1/2255 |
| | | | | 359/326 |
| 2011/0110628 A1* | 5/2011 | Okamoto | | H01L 31/1085 |
| | | | | 385/37 |
| 2013/0120323 A1* | 5/2013 | Scharff | | G06F 3/043 |
| | | | | 345/177 |
| 2015/0107357 A1* | 4/2015 | Hentz | | G01D 5/266 |
| | | | | 73/382 G |
| 2015/0316580 A1* | 11/2015 | Hutchison | | G01D 5/268 |
| | | | | 250/227.14 |

OTHER PUBLICATIONS

U.S. Appl. No. 16/026,535, filed Jul. 3, 2018, Boris Taurel, et al.
U.S. Appl. No. 13/702,790, filed Feb. 20, 2013, 2013/0144542 A1, Thomas Ernst, et al.
U.S. Appl. No. 15/245,472, filed Aug. 24, 2016, 2017/0059499 A1, Laurent Duraffourg.
U.S. Appl. No. 15/274,153, filed Sep. 23, 2016, 2017/0089944 A1, Laurent Duraffourg.
French Preliminary Search Report dated Jul. 10, 2018 in French Application 17 60929, filed on Nov. 20, 2017 (with English Translation of Categories of Cited Documents).
Kouh, T., et al. "Nanomechanical Motion Transducers for Miniaturized Mechanical Systems", Micromachines, vol. 8, No. 4, 2017, 13 pages.
Sauer, V., et al. "Optical racetrack resonator transduction of nanomechanical cantilevers", Nanotechnology, vol. 25, 2014, 12 pages.

* cited by examiner

SYSTEM FOR TRANSDUCTION OF DISPLACEMENT TO OPTICAL PHASE SHIFT

TECHNICAL DOMAIN

The invention relates to the field of optomechanical systems that make use of mutual coupling effects between optics and mechanics to translate a mechanical displacement within the system into a change in the phase and/or intensity of an optical signal circulating in the system.

STATE OF PRIOR ART

Prior art includes an optomechanical sensor capable of detecting the movement of a nanobeam due to optical coupling between this nanobeam and a micro-ring resonator.

Such a sensor is described for example in the paper "*Optical racetrack resonator transduction of nanomechanical cantilevers*", par V. T. K. Sauer & al., Nanotechnology, vol. 25 (2014).

The micro-ring resonator does not comprise a cladding. The surrounding medium acts as a cladding.

This micro-resonator is coupled to an injection and extraction waveguide by evanescent coupling. Evanescent coupling makes an energy transfer between a guided mode of the injection and extraction waveguide and a guided mode of the micro-resonator. This energy transfer is maximum at resonant wavelengths of the micro-resonator (wavelengths for which the phase shift due to one turn in the ring is a multiple of 2n).

During operation, a light beam is sent to the input of the injection and extraction waveguide. Part of the light beam escapes into the micro-resonator. At resonant wavelengths, it makes one or several turns before returning to the injection and extraction waveguide.

There are optical losses to light passing through the micro-resonator, particularly due to absorption by the surrounding medium and the roughness of the micro-resonator. Therefore there is a series of local minima in the light beam at the output from the injection and extraction waveguide, at resonant wavelengths of the micro-resonator.

The nanobeam is located in the near field of the micro-resonator. Therefore movements of the nanobeam locally disturb the optical index of the micro-resonator cladding, which changes the effective index of the micro-resonator, and therefore the phase of the wave circulating in the micro-resonator. Therefore values of resonant wavelengths of the micro-resonator are modified. Therefore the position of the nanobeam can be indirectly observed by observing these values of the resonant wavelengths.

One disadvantage of this device is that there are optical leaks by evanescent coupling between the nanobeam and the micro-resonator, that depend on the position of the nanobeam relative to the micro-resonator. In other words, the position of the nanobeam changes not only the phase of the wave circulating in the micro-resonator, but also losses introduced by the micro-resonator.

These losses vary exponentially as a function of the position of the nanobeam and have non-linear effects that strongly limit the dynamics of the system, when displacements of the nanobeam exceed the limit of very small displacements (which is less than 20 nm).

One objective of this invention is to propose an optomechanical system for transduction of a displacement into an optical phase shift, capable of limiting additional effects on the intensity.

PRESENTATION OF THE INVENTION

This objective is achieved with an optomechanical system for transduction of a displacement into an optical phase shift, comprising:
   at least one guide structure adapted to guiding a light beam centred on a predetermined wavelength called the guided wavelength; and
   at least two waveguide segments, each arranged to carry a light beam as far as the at least one guide structure, or to move a light beam emerging from the at least one guide structure to a distance.

According to the invention:
   the at least one guide structure comprises a plurality of beams parallel to each other, distributed one following the other along a long axis of the guide structure, and arranged in two combs partly nested one in the each other; and in the at least one guide structure, at least one beam is mobile, free to move in translation relative to the other beams in the same guide structure along an axis orthogonal to the long axis of the guide structure.

The guide structure is adapted to guide the light beam centred on the guided wavelength. Therefore said guide structure is equivalent to a waveguide, which is called the equivalent waveguide.

The beams in the guide structure are arranged as two combs. In other words, said beams are distributed in two series of beams, each series of beams forming the fingers of a comb.

These two combs are partially nested one in the other. In other words, each beam in a first of said series of beams (except for the two end beams) has an end region directly or indirectly interleaved between two beams of the other second series of beams. The opposite end of said beam is surrounded only by beams of the same first series of beams. Such an arrangement can be called an arrangement in interdigitated combs.

The beams in each of the series can be distributed alternately, such that each beam in a first of said series of beams (except for the two end beams) has an end region directly interleaved between two beams of the other second series of beams.

As an alternative, sets of several adjacent beams in a first of said series of beams can be interleaved between two beams in the other second series of beams. Each beam in said first series (except for the two end beams) then has an end region indirectly interleaved between two beams of the other second series. This case corresponds particularly but not only to the case in which the first series comprises more beams than the second series.

A nesting region of the combs designates a convex volume delimited by all the end regions directly or indirectly interleaved between two beams of the other series. Said nesting region of the combs corresponds to the core of the equivalent waveguide mentioned above.

When the mobile beams move in translation along an axis orthogonal to the long axis of the guide structure, the width and/or the height of the nesting region of the combs is modified, which corresponds to a change in the width and/or the height of the core of the equivalent waveguide.

This results in a change in the effective index of the equivalent waveguide and therefore in the phase of the wave guided in this equivalent waveguide.

The guide structure thus forms a transducer of a displacement, in this case the displacement of at least one mobile beam, into an optical phase shift, in this case an optical phase shift of the wave guided in the guide structure.

Furthermore, the transduction system is not based on an evanescent coupling phenomenon, such that it intrinsically has an effect only on the optical phase. Therefore the invention can limit additional effects on the intensity, associated with transduction of the displacement of mobile beams into an optical phase shift.

BRIEF DESCRIPTION OF THE DRAWINGS

This invention will be better understood after reading the description of example embodiments given purely for information and that are in no way limitative, with reference to the appended drawings on which.

DETAILED PRESENTATION OF PARTICULAR EMBODIMENTS

To clarify matters, the (Ox), (Oy) and/or (Oz) axes of an orthonormal coordinate system are shown on the figures.

Figures 1A, 1B:
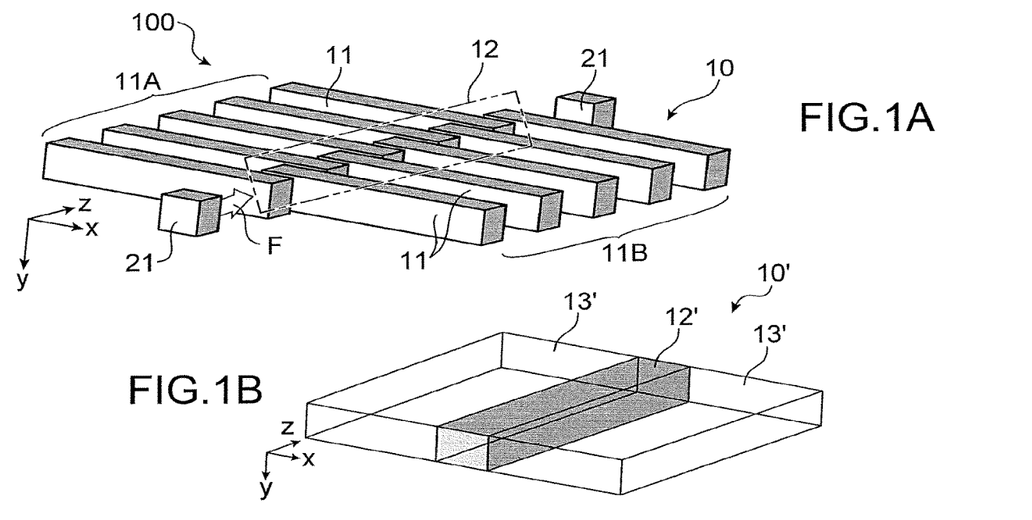
FIGS. 1A and 1B are perspective views diagrammatically illustrating a first embodiment of an optomechanical system and a guide structure according to the invention, and the waveguide equivalent to said guide structure.

FIG. 1A is a perspective view diagrammatically illustrating a first embodiment of an optomechanical system 100 according to the invention.

In this case, the optomechanical system comprises a single guide structure 10 composed of a plurality of beams 11.

Preferably, all beams 11 have the same composition (same material, or same structure composed of several materials).

Each beam 11 is elongated in shape along a corresponding longitudinal axis. The respective longitudinal axes corresponding to each of the beams are parallel to each other, in this case parallel to the (Ox) axis.

In this case, each beam 11 is in the shape of a rectangular parallelepiped, of which the largest dimension extends along the (Ox) axis, and the smallest dimension extends along the (Oz) axis.

Preferably, but non-limitatively, all the beams 11 have the same dimensions.

The beams 11 are distributed in two series of beams 11A, 11B.

In each series 11A and 11B respectively, the beams 11 are aligned along the (Ox) and (Oy) axes, and are distributed one after the other along an axis parallel to the (Oz) axis. Each series of beams thus forms a comb, each tooth or finger of which is formed by a beam.

The beams in each series 11A, 11B are distributed at a regular pitch. This pitch can be identical in the two series of beams.

In the example shown in FIG. 1A, the beams of the two series 11A and 11B are distributed alternately along an axis parallel to the (Oz) axis. In other words, each beam 11 in one series is located between two beams of the other series (except for the two end beams in the guide structure).

Furthermore, the two series of beams 11A, 11B are offset from each other along the (Ox) axis. The (Ox) axis is parallel to the longitudinal axes of the beams 11. Thus, each beam 11 in one series extends, at only one of its ends, between two beams of the other series. The two series of beams 11A, 11B thus form two combs partly nested one in the other.

The beams 11 in the two series 11A, 11B are thus distributed one after the other along an axis parallel to the (Oz) axis, and are not in line along the (Ox) axis.

A nesting region 12 is defined corresponding to a region in which the two series of beams are nested with each other. In this case, said nesting region 12 is composed of the ends of beams 11.

"Long axis of the guide structure" refers to an axis parallel to (Oz), passing through the centre of said nesting region 12.

In the nesting region 12, the beams in the two series 11A and 11B are distributed at a regular pitch. In other words, along the (Oz) axis, each beam 11 in one series is located at the middle of the interstice between two beams of the other series (except for the two end beams in the guide structure).

The beams in the two series are suspended above a substrate, surrounded by a gas medium such as air, or a liquid medium.

A light beam F is considered centred on a predetermined wavelength, called the guided wavelength $\lambda$.

The guide structure 10 is adapted to guide the light beam F, such that this light beam propagates from one beam to the next along the (Oz) axis in the nesting region 12.

The long axis of the guide structure thus forms an axis of light guiding in the guide structure 10.

In particular, in the nesting region 12, the two series of beams 11A, 11B together form a sub-wave length periodic structure.

Figures 2A, 2B:
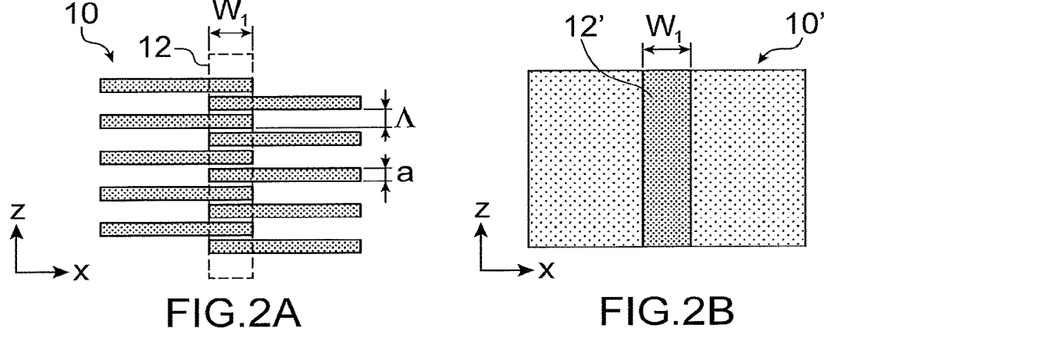
FIGS. 2A and 2B are top views diagrammatically illustrating the guide structure of FIG. 1A and the equivalent waveguide, in a first position.

In particular, they form a periodic structure in said nesting region 12, with an elementary pattern with dimension $\Lambda$ along the long axis of the guide structure (see FIG. 2A). $\Lambda$ defines the period of said periodic structure.

In this case, each elementary pattern comprises a single beam portion, belonging alternatively to the first series of beams 11A and to the second series of beams 11B.

The period $\Lambda$ is very much smaller than the guided wavelength $\lambda$. For example we have:

$$\Lambda < \frac{\lambda}{10}.$$

More precisely, the period $\Lambda$ is a distance along (Oz), satisfying:

$$2\pi\Lambda < \frac{\lambda}{n_{eff}} \quad (1)$$

in which $n_{eff}$ is the effective index of guided mode in the guide structure 10.

FIG. 1B shows a perspective view of a waveguide 10' equivalent to the guide structure 10, called the equivalent waveguide.

The equivalent waveguide 10' comprises a core 12', and two lateral claddings 13'.

The core 12' is the optical equivalent of the nesting region 12. Its dimensions are the same as the dimensions of the nesting region 12. Therefore in this case it is a rectangular parallelepiped with the same width along (Ox) as the nesting region 12. Its optical index $n_{eq,c}$ depends on the optical index of the beams, $n_2$, and the optical index of the medium surrounding the beams, $n_1$. In particular we have:

$$n_{eq,c}^2 = n_1^2 + DC_c(n_2^2 - n_1^2) \quad (2)$$

in which $DC_c$ is the aspect ratio in the nesting region 12, defined by $DC_c = a/\Lambda$, in which a is the dimension of each beam along the (Oz) axis (see FIG. 2A).

Each lateral cladding 13' is the optical equivalent of the first series of beams, respectively of the second series of beams, minus the portions of beams located in the nesting region 12. Its optical index $n_{eq,g}$ depends on the optical indexes $n_2$ and $n_1$ defined above. In particular we have:

$$n_{eq,g}^2 = n_1^2 + DC_g(n_2^2 - n_1^2) \quad (3)$$

in which $DC_g$ is the aspect ratio in each series of beams, outside the nesting region 12, defined by $DC_g = a/2\Lambda$.

The upper and lower claddings are not considered in the following because they are composed solely of the medium surrounding the beams, with index $n_1$.

According to the invention, at least one beam is mobile, free to move in translation relative to the other beams along an axis orthogonal to the long axis (Oz) of the guide structure.

In this case, at least one beam 11 is mobile, free to move in translation along an axis parallel to its longitudinal axis (parallel to (Ox)).

In practice, all beams in the guide structure are suspended above a substrate. A mobile beam can be a beam mounted fixed to a mechanical element free to move relative to the substrate. The other fixed beams are rigidly attached to a mechanical element fixed relative to the substrate. According to one alternative not shown, a beam can be considered to be mobile because it is longer than the other beams. In this case, it projects beyond the other beams of the same series only on the side opposite the nesting region.

In this case, the beams in the second series 11B are fixed relative to each other and are mobile, free to move relative to the beams of the first series of beams 11A. The beams in the first series of beams 11A are fixed.

In FIG. 2A, the guide structure 10 is shown diagrammatically in a top view in a first position of the mobile beams, for example called the rest position. The nesting region 12 then has a first width, $W_1$ (said width being defined along the (Ox) axis).

The rest position corresponds to a position of the beams in the guide structure in the absence of any mechanical loads on the at least one mobile beam.

FIG. 2B shows the equivalent waveguide 10', with a core 12' with width $W_1$.

Figures 3A, 3B:
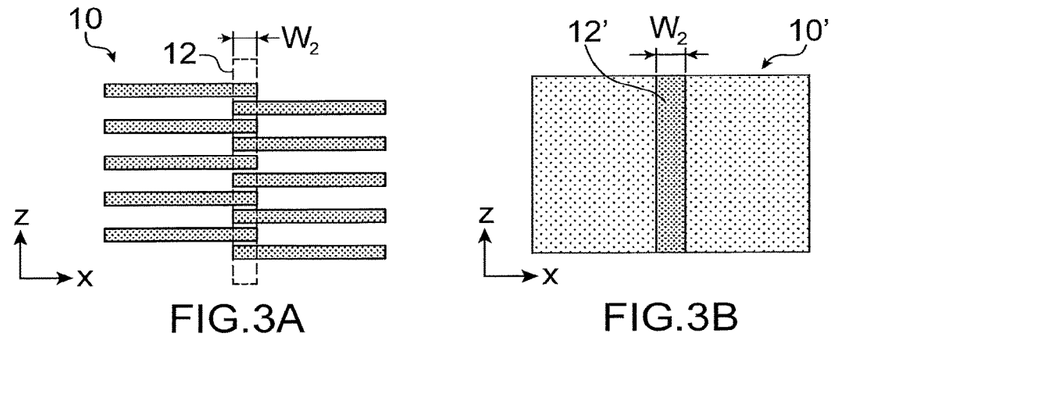
FIGS. 3A and 3B are top views diagrammatically illustrating the guide structure of FIG. 1A and the equivalent waveguide, in a second position.

In FIG. 3A, the guide structure 10 is shown diagrammatically in a top view in a second position of the mobile beams. The nesting region then has a second width, $W_2$.

FIG. 3B shows the equivalent waveguide 10', with a core 12' with width $W_2$.

The variation of the width $\Delta W = |W_1 - W_2|$ results in a variation of the effective index of the guide structure and of the equivalent waveguide.

Said variation of the effective index results in a variation of an optical phase shift provided by the guide structure.

Over a propagation length $\mathcal{L}$ in the guide structure (length defined along the (Oz) axis), and for a wavelength $\lambda$ (wavelength in a vacuum), the phase acquired by the wave guided in the guide structure 10 is equal to:

$$\varphi = \frac{2\pi n_{eff} \mathcal{L}}{\lambda} \quad (4)$$

Thus, if the effective index varies by $\Delta n_{eff}$, the phase acquired by the wave guided in the guide structure 10 varies by:

$$\Delta\varphi = \frac{2\pi \Delta n_{eff} \mathcal{L}}{\lambda} \quad (5)$$

Figure 4:
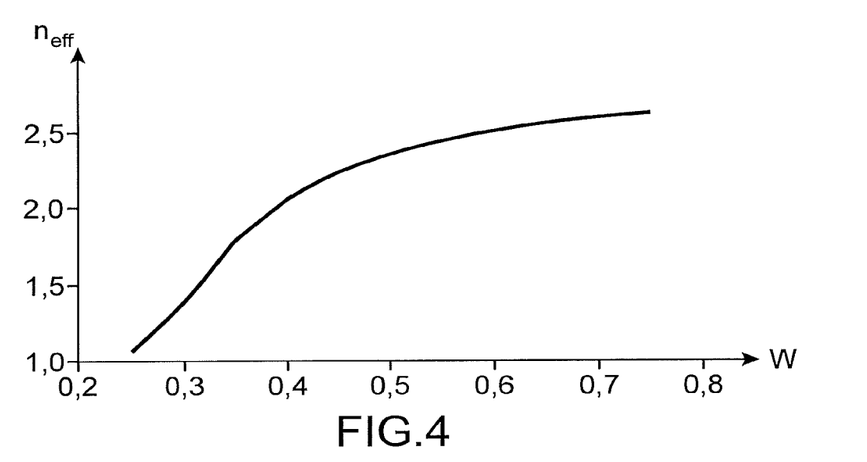
FIG. 4 illustrates the variation of the effective index of the equivalent waveguide of FIG. 1B, as a function of the width of its core zone.

FIG. 4 represents the variation of the effective index of the guide structure, as a function of the width W (in μm) of the nesting region. In this example, the beams are made of silicon suspended in air.

The effective index varies relatively slowly with W. Thus, within the limit of small displacements (for example less than 50 nm), the variation $\Delta n_{eff}$ of the effective index is linearly related to the displacement $\Delta x$ of at least one mobile beam (corresponding to the variation of width $\Delta W$ of the nesting region 12). We then have:

$$\Delta n_{eff} = \alpha \Delta x \quad (6)$$

in which $\alpha$ is a coefficient, calculated numerically or using an approximate analytic model, for example the effective index method.

Therefore the final result is:

$$\Delta\varphi = \frac{2\pi \mathcal{L}}{\lambda} \alpha \Delta x \quad (7)$$

Thus, it is very easy to relate a displacement $\Delta x$ of at least of the at least one mobile beam, to a phase shift $\Delta\varphi$ of the wave guided in the guide structure 10.

If the displacements exceed the limit of small displacements, it remains possible to relate $\Delta x$ and $\Delta\varphi$. All that is lost is simply the linear relation between $\Delta n_{eff}$ and $\Delta x$.

It will be seen that diagrammatically the guide structure according to the invention resembles a structure known in the electronics field, composed of two electrodes forming two interdigitated combs.

Such electrodes are not adapted to guide a light beam.

In any case, according to the invention, the optomechanical system also comprises two waveguide segments 21, one to bring the light beam F to the input of the guide structure 10, the other to carry away the light beam F emerging from the guide structure 10.

The propagation axis associated with each of the segments 21 is aligned with the long axis of the guide structure.

Preferably, each of the segments 21 is composed of a single rectangular parallelepiped with the same composition as the beams of the guide structure. The segments 21 are not necessarily arranged suspended.

The invention is not limited to a particular choice of material for beams forming the guide structure, nor to a value of the guided wavelength λ.

Preferably, materials currently used in guided optics are used in priority, at wavelengths not absorbed by these materials. For example, the beams forming the guide structure are made of silicon, silica, silicon nitride, III-V material (alloy of an element in column III and an element in column V in the periodic table of chemical elements), etc.

The following defines a preferred interval of values of the width W of the nesting region.

Preferably, a low limit, $W_{min}$, is fixed such that the spatial extent of the evanescent optical field does not extend beyond the beams, along the (Ox) axis.

Therefore for a beam dimension 1 along the (Ox) axis, $W_{min}$ is adapted such that the spatial extent of guided mode in the guide structure is less than 1.

An approximation in two dimensions is made of the field outside the nesting region, using the effective index method:

$$E(x) = \frac{\exp\left(-k\frac{W}{2}\sqrt{n_{eff,y}^2 - n_{eq,g}^2}\, x\right)}{\exp\left(-k\frac{W}{2}\sqrt{n_{eff,y}^2 - n_{eq,g}^2}\right)} \quad (8)$$

in which k is the wave vector, $n_{eff,y}$ is an effective index in two dimensions of the guide structure, taking account of wave confinement along the (Oy) axis, and $n_{eq,g}$ is the effective index of lateral claddings of the guide structure, defined by equation (3).

$W_{min}$ is the width such that 99% of the field is contained in 90% of the guide structure. Therefore $W_{min}$ is defined by:

$$\frac{\exp\left(-k\frac{W_{min}}{2}\sqrt{n_{eff,y}^2 - n_{eq,g}^2}\, 0,9l\right)}{\exp\left(-k\frac{W_{min}}{2}\sqrt{n_{eff,y}^2 - n_{eq,g}^2}\right)} = 0.01 \quad (9)$$

Namely:

$$W_{min}(1-0.9l)k\sqrt{n_{eff,y}^2 - n_{eq,g}^2} = \ln(0.01) \quad (10)$$

Preferably, the guide structure is sized such that the width W of the nesting region remains greater than $W_{min}$.

Preferably, a high limit for W, denoted $W_{max}$, is fixed such that the equivalent optical guide is monomode.

$W_{max}$ is then defined by:

$$W_{max} = \frac{\lambda}{4\sqrt{n_{eff,y}^2 - n_{eq,g}^2}} \quad (11)$$

Preferably, the guide structure is sized such that the width W of the nesting region remains less than $W_{max}$.

Figure 5A:
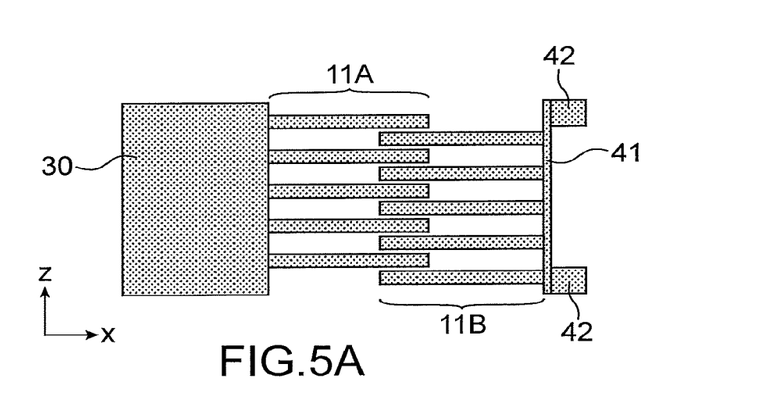
FIGS. 5A and 5B illustrate two solutions for suspending the mobile beams in an optomechanical system according to the invention.
Figure 5B:
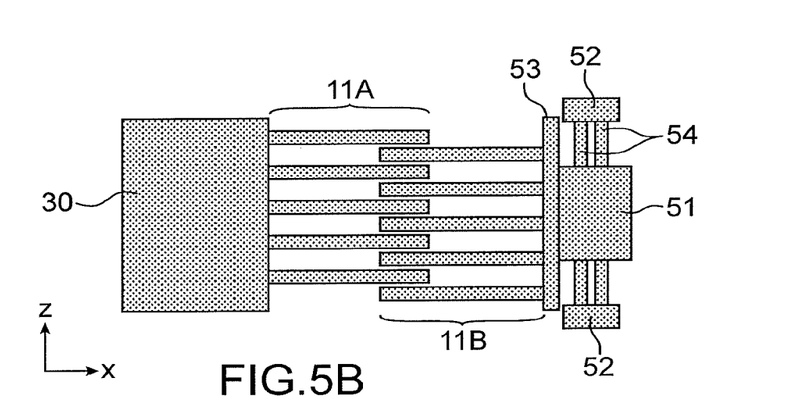

FIGS. 5A and 5B illustrate two alternatives for suspension of the mobile beams in an optomechanical system according to the invention.

As above, it is considered that the beams in the first series 11A are fixed and the beams in the second series 11B are mobile.

In the two alternatives, the beams in the first series 11A are mounted fixed to a fixed support 30, at their ends located on the side opposite to the beams of the second series 11B. The fixed support 30 is fixed relative to the substrate, not represented, above which the beams are suspended.

In FIG. 5A, the beams in the second series 11B are mounted fixed to a support 41, at their ends located on the side opposite to the beams of the first series 11A. The support 41 extends along the (Oz) axis. It is mounted suspended above the substrate, due to two pillars 42 located on at each of its two ends, along the (Oz) axis. It has vibration modes along the (Ox) axis. When the support 41 starts vibrating, the beams in the second series 11B displace in translation along the (Ox) axis. Each beam in the second series 11B then displaces along the (Ox) axis, at a distance that depends on its position relative to the vibration antinodes and nodes of the support 41. The suspended support 41 may for example be in the form of a support beam, oriented transverse to the beams of the guide structure.

In FIG. 5B, the beams in the second series 11B are mounted fixed to a rigid plate 51, in this case through a transverse connection beam 53. The rigid plate 51 is connected to two pillars 52, for suspension above the substrate. It is connected to these two pillars 52 through support arms 54. Each of the pillars 52 extends along the (Oy) axis. Each support arm 54 each extends along the (Oz) axis. Each has a small dimension along the (Ox) axis, authorising a movement of the rigid plate 51 along the (Ox) axis. The rigid plate may be solid or perforated.

There are many other mechanical suspension solutions, to authorise the movement of at least one mobile beam, that can be used without going outside the framework of the invention.

Figure 6:
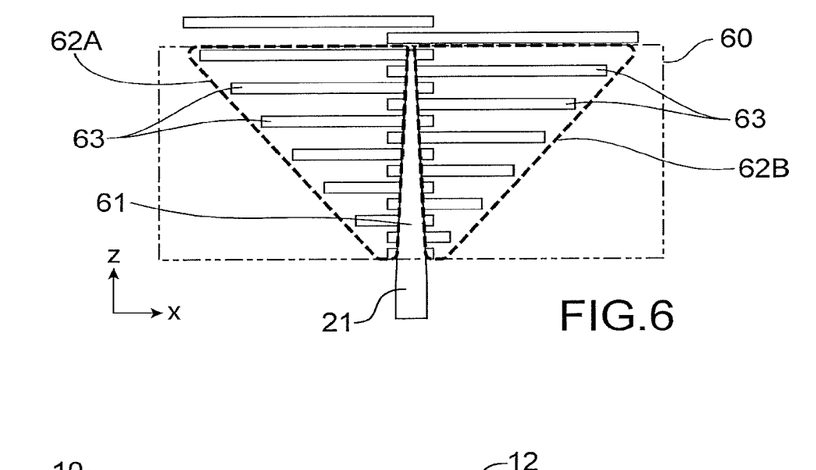
FIG. 6 illustrates a mode adapter for the guide structure of an optomechanical system according to the invention.

FIG. 6 illustrates a mode adaptor 60, to make an adaptation between a guided mode in a waveguide segment 21, and a guided mode in a guide structure according to the invention.

Such a mode adapter 60 is advantageously located at the input to or the output from the guide structure, at one of its ends along the long axis of said structure.

The mode adapter 60 has:
a central region 61; and
two lateral regions 62A, 62B, that are not symmetric with each other, each composed of beams called adaptation beams 63.

In this case the central region 61 is in the form of a straight cylinder with a trapezoidal base with width (dimension along the (Ox) axis) decreasing with decreasing distance from the guide structure (along an axis coincident with the long axis of the guide structure).

The central region 61 has plane symmetry relative to a plane parallel to the (yOz) plane.

The lateral regions 62A, 62B are located on each side of the central region, along an axis parallel to (Ox).

Each is composed of beams 63, called adaptation beams, oriented like the beams in the guide structure.

Preferably, the adaptation beams 63 are formed in a single piece with the central region 61.

The dimension of adaptation beams along the (Ox) axis (longitudinal axis of beams of the guide structure), progressively increases with decreasing distance from the guide structure (along an axis coincident with the long axis of the guide structure).

The dimensions of adaptation beams 63 along the (Oy) and (Oz) axes are the same as the dimensions of beams in the guide structure.

The mode adapter 60 has the same composition (same material, or same structure composed of several materials) as beams in the guide structure.

The adaptation beams can be arranged to be suspended, like beams in the guide structure. As an alternative, the adaptation beams can be embedded in a material with an index close to the index of the medium surrounding the beams in the guide structure.

The mode adapter 60 can result in a loss of less than 0.1% of the signal during injection of a light beam into the guide structure, respectively during extraction out of the guide structure (compared with 20% without the mode adapter 60).

Figure 7A:
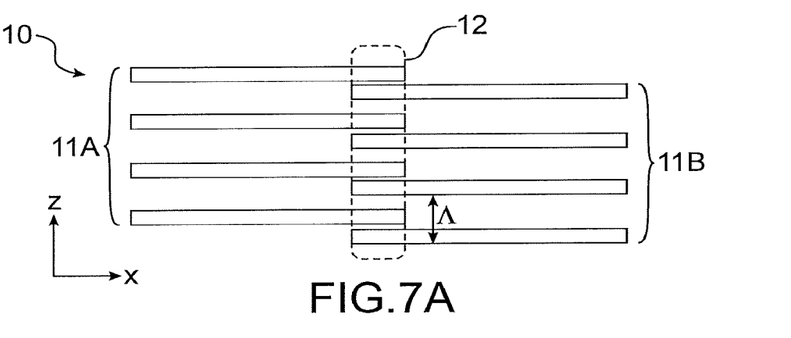
FIGS. 7A and 7B illustrate a second and a third embodiment respectively of a guide structure according to the invention.
Figure 7B:
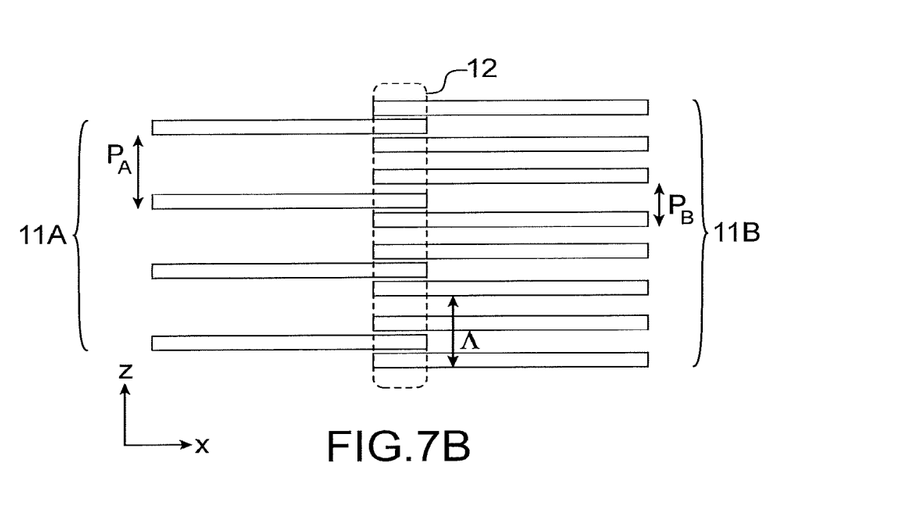

FIGS. 7A and 7B illustrate two alternatives of a guide structure 10 according to the invention.

In FIG. 7A, the beams in the first series 11A and the beams in the second series 11B are distributed at the same regular pitch.

However, in the nesting region 12, the beams of the two series are not distributed together at a regular pitch. Each beam of one series is offset along the (Oz) axis relative to the mid-point of the interstice between two beams of the other series.

The beams in the guide structure form a periodic structure in the nesting region 12, with an elementary pattern with dimension Λ along the long axis of the guide structure. In this case, this elementary pattern comprises a beam of the first series 11A and a beam of the second series 11B.

In FIG. 7B, the beams in the first series 11A are distributed at a first regular pitch $P_A$, and the beams in the second series 11B are distributed at a second regular pitch $P_B$ different from $P_A$. For example we have $P_A=2P_B$.

The beams of the guide structure form a periodic structure in the nesting region 12, with an elementary pattern with one beam of the first series 11A and two beams of the second series 11B.

Many other distributions of beams in the guide structure can be used without going outside the framework of the invention.

For example, the beams in each series of beams are not necessarily distributed at a regular pitch, provided that their layout is periodic along the (Oz) axis.

The simulation results validating the theoretical explanations developed above are then illustrated.

Figure 8A:
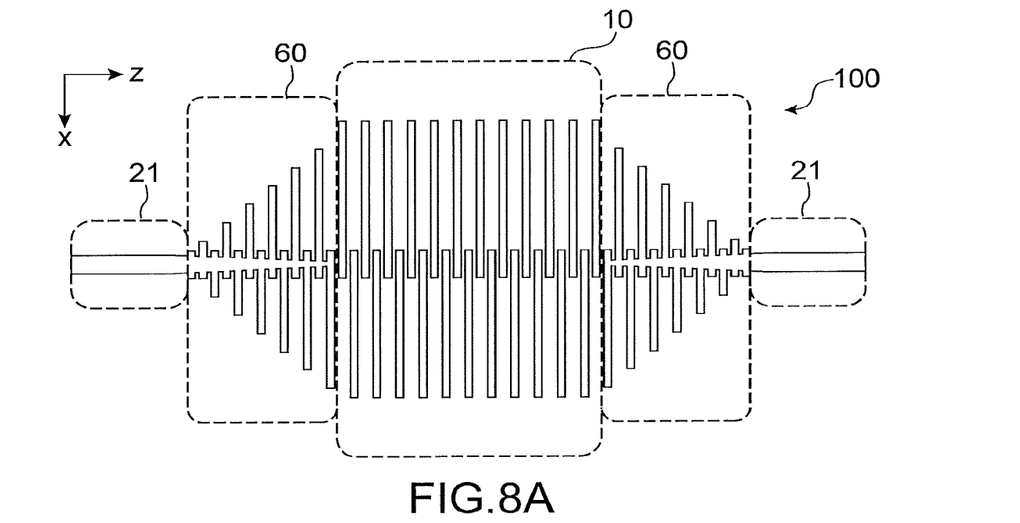
FIGS. 8A to 8C illustrate an example of an optomechanical system according to the invention, and simulation results associated with this system.

FIG. 8A illustrates an optomechanical system 100 used for the simulation.

The optomechanical system 100 comprises a guide structure 10 like that described with reference to FIG. 1A, located between two mode adapters 60 like that in FIG. 6, the assembly itself being located between two waveguide segments 21.

One of the series of beams is mobile, free to move in translation along the (Ox) axis, relative to the other series of beams. The corresponding displacements of each of the mobile beams are identical.

The characteristics of the system 100 are as follows:
  guided wavelength: Λ=1550 nm;
  period of the periodic structure in the nesting region: Λ=100 nm;
  aspect ratio in the nesting region: $DC_c=\frac{1}{2}$;
  dimension of beams along (Ox): 5 µm;
  dimension of each mode adapter along (Oz): 20 µm;
  dimension of the guide structure along (Oz): 30 µm;
  width of the nesting region, in a rest position of the beams: W=600 nm;
  material of the guide structure, mode adapters and waveguide segments: silicon.

Figure 8B:
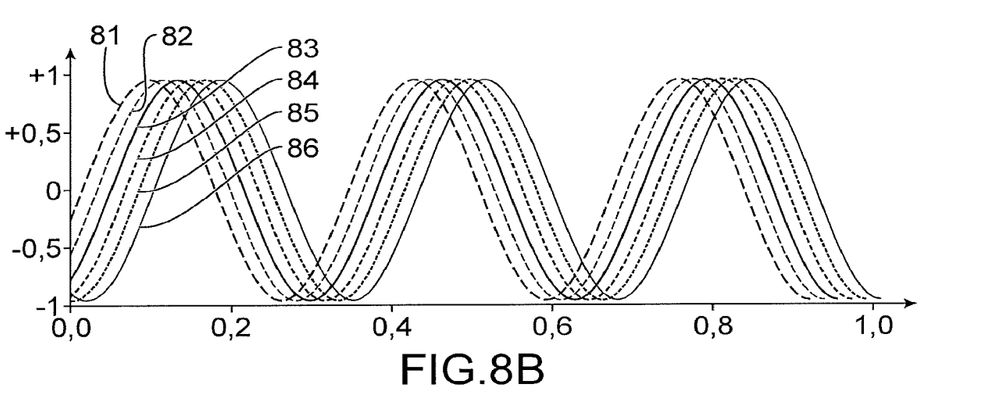

FIG. 8B illustrates the real component of the electric field at the output from the optomechanical system 100 as a function of a propagation distance along (Oz), for different displacement values Δx of mobile beams.

Each of the curves 81, 82, 83, 84, 85 and 86 corresponds to Δx=0 nm; Δx=10 nm; Δx=20 nm; Δx=30 nm; Δx=40 nm; Δx=50 nm respectively.

The appearance of a phase shift proportional to the displacement Δx of the mobile beams can be clearly seen.

Figure 8C:
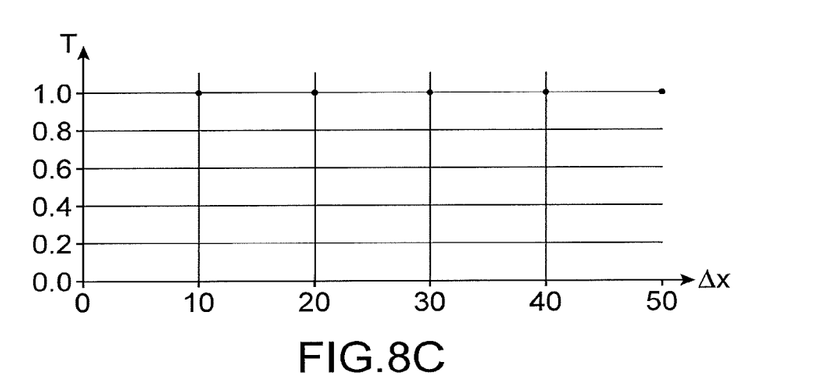

Furthermore, this phase shift is not accompanied by a loss of signal intensity. This second point is also illustrated in FIG. 8C, representing a transmission T as a function of the displacement Δx of the mobile beams. Relative losses are less than 0.1%.

According to equation (7), when the at least one mobile beam is displaced by a distance Δx, the phase acquired by the guided wave in the guide structure varies by a value Δφ, dependent on the propagation length $\mathcal{L}$ of the guided wave in the guide structure.

Thus, by increasing the value of the propagation length $\mathcal{L}$, the smallest detectable displacement value Δx can be increased.

This can be achieved by increasing the extent of the guide structure along its long axis.

Another more ingenious solution consists of increasing the value of the propagation length $\mathcal{L}$, by multiplying guided wave passes in the guide structure.

To achieve this, the optomechanical system according to the invention comprises an optical resonator, resonant at the guided wavelength λ, within which the guide structure is positioned. The guide structure is then located on the optical path of a light beam circulating in said resonator.

Figure 9:
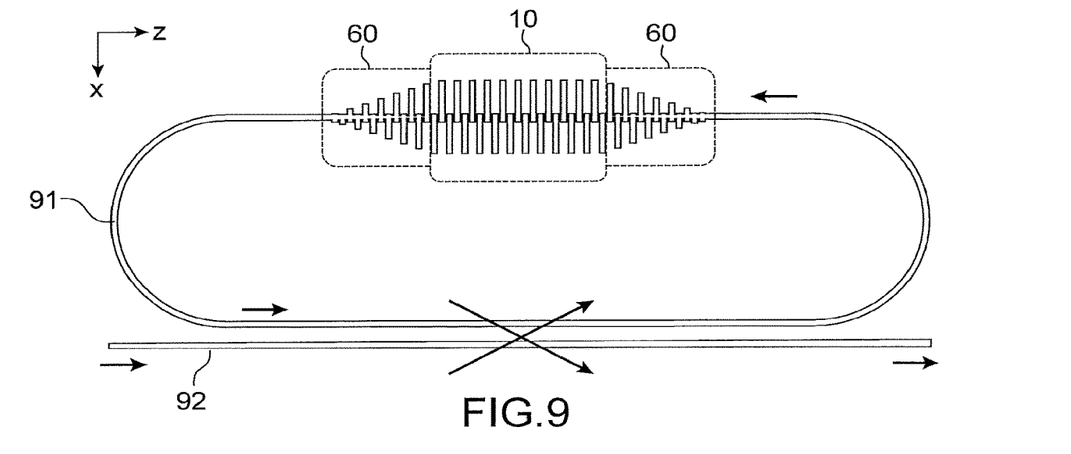
FIGS. 9, 10A and 10B illustrate different examples of optomechanical systems according to the invention, in which the guide structure is located in an optical resonator.

FIG. 9 illustrates an example in which the optical resonator is of the resonant ring type.

The resonant ring is composed of a waveguide 91 and a guide structure 10 according to the invention, in this case located between two mode adapters 60. The assembly is adapted to achieve an optical guiding along a closed loop optical path. In this case, this optical path has two straight portions parallel to (Oz), and two portions in the form of a half-circle. The guide structure 10 is located on one of the two straight portions.

FIG. 9 also shows an injection and extraction waveguide 92, for injection and extraction of a light beam in and outside the optical resonator, by evanescent coupling.

The arrows diagrammatically illustrate light circulation directions.

Such an optomechanical system makes it possible to obtain a coupling ratio $g_{om}$, representing the sensitivity of the system to a displacement Δx, of the order of 12 GHz/nm (unit used by convention, the frequency and the wavelength being related by λ=c/f, in which c is the speed of light in a vacuum). This rate is about 10 times higher than the rate that can be obtained in a system according to prior art as described in the introduction.

Figure 10A:
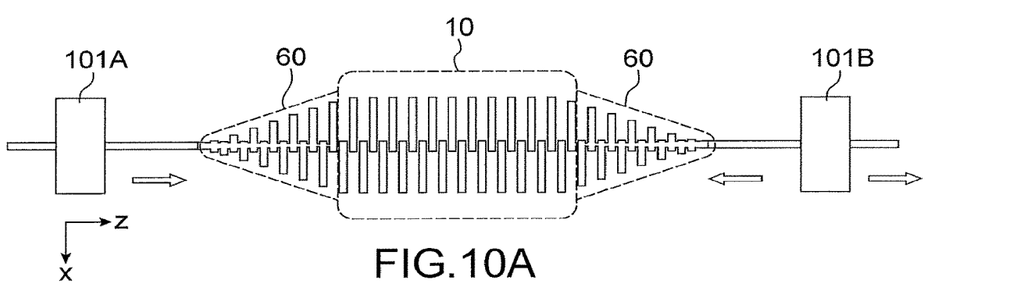

FIG. 10A illustrates an example in which the optical resonator is a linear cavity, or a Fabry-Perot cavity.

The cavity is composed of two mirrors 101A, 101B, reflecting at the guided wavelength λ. A guide structure 10 according to the invention, in this case located between two mode adapters 60, is located between the two mirrors 101A, 101B.

The arrows diagrammatically indicate the directions of light circulation, in this case making several forward and return passes along the (Oz) axis, between the two mirrors.

Figure 10B:
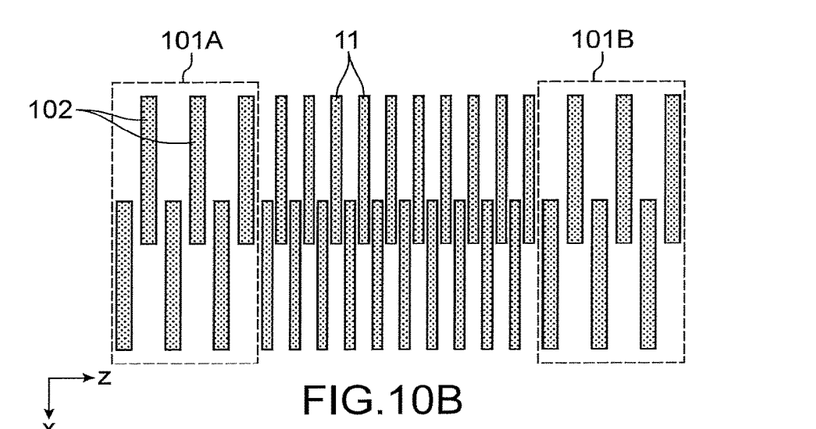

FIG. 10B illustrates one advantageous variant in which each of the mirrors 101A, 101B is composed of a Bragg grating.

Each Bragg grating is composed of two sets of secondary beams 102 distributed into two end combs, partially nested one in the other. Each Bragg grating is located in a nesting region between these two sets of secondary beams.

The secondary beams 102 are not distributed at the same pitch as the beams 11 of the guide structure (the difference in pitch is deliberately exaggerated in FIG. 10B). The distribution pitch between secondary beams 102 in the nesting region is preferably equal to $\lambda/4$, where $\lambda$ is the wavelength guided by the guide structure 10. Therefore this pitch is much higher than the periodic pattern formed by the beams of the guide structure 10 in the associated nesting region.

The secondary beams 102 do not necessarily have the same thickness as the beams 11 of the guide structure (dimension along (Oz)).

Preferably, they have the same composition as the beams 11 in the guide structure.

Similarly, preferably they have the same dimension along (Ox) as the beams 11 in the guide structure.

Other alternatives can be used without going outside the framework of the invention, for example with a linear cavity closed by two Sagnac loops. A Sagnac loop is a mirror used in the field of optics integrated on substrate, using evanescent coupling between two waveguides connected by a loop.

The phase shift $\Delta\varphi$ can be read by placing the guide structure inside an optical resonator, and reading the position of resonance peaks.

As an alternative, the phase shift $\Delta\varphi$ can be read by placing the guide structure inside an interferometer, and reading the position of transmission peaks.

In particular, the guide structure can be placed inside one of the arms of a Mach-Zehnder interferometer. Such an interferometer comprises a separator (for example a Y junction or a multimode interference coupler), to distribute an incident light beam on two different optical paths called "arms". At the output from these two arms, a recombination element (for example a Y junction or a multimode interference coupler) makes it possible to combine the light beams that have passed through each of the two arms. Recombination produces interference related to the phase difference between light beams that circulated in each of the two arms.

Figure 11:
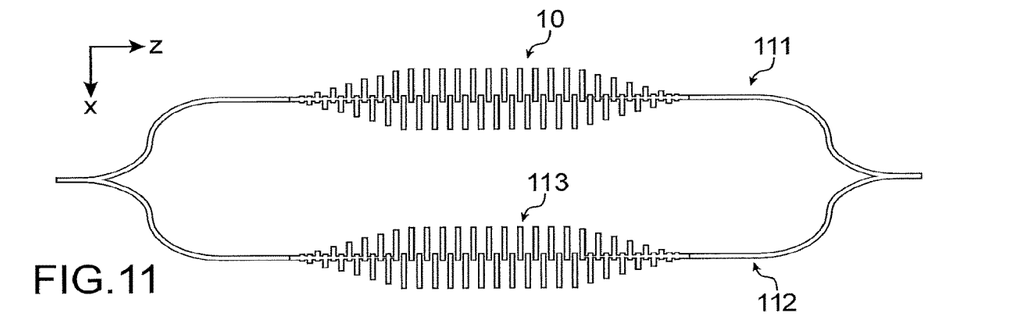
FIG. 11 illustrates an optomechanical system according to the invention, in which the guide structure is located in an interferometer.

FIG. 11 contains a diagrammatic representation of an example of an optomechanical system according to the invention, including a Mach-Zehnder interferometer.

The guide structure is located in a first arm 111 of the interferometer.

The second arm 112 of the interferometer may comprise a structure called the reference structure 113, suspended above a substrate.

The reference structure 113 is identical to the guide structure 10, except that all its beams are fixed relative to the substrate.

In this case, the guide structure 10 and the reference structure 113 are each located between two mode adapters as described with reference to FIG. 6.

Waveguide segments located upstream and downstream from each guide structure are made of silicon, and they have a section of 500 µm×200 µm.

Therefore the phase difference between the light beams that circulated in each of the two arms 111, 112 depends on the displacement $\Delta x$ of the mobile beams of the guide structure 10.

Figure 12A:
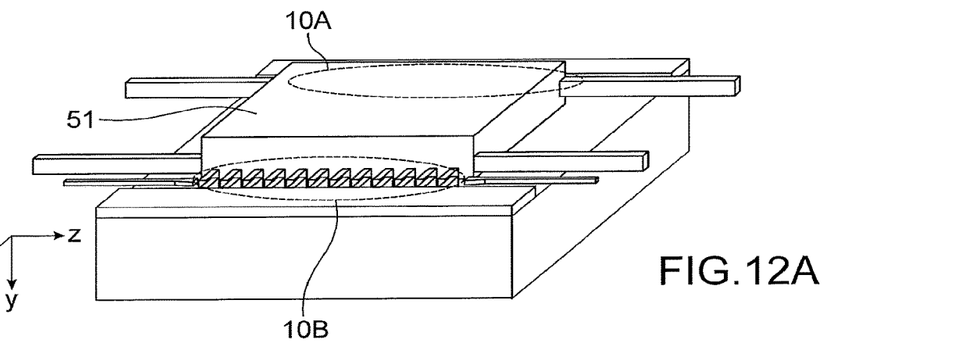
FIGS. 12A to 12C illustrate different views of an optomechanical system according to the invention adapted to form an accelerometer.
Figure 12B:
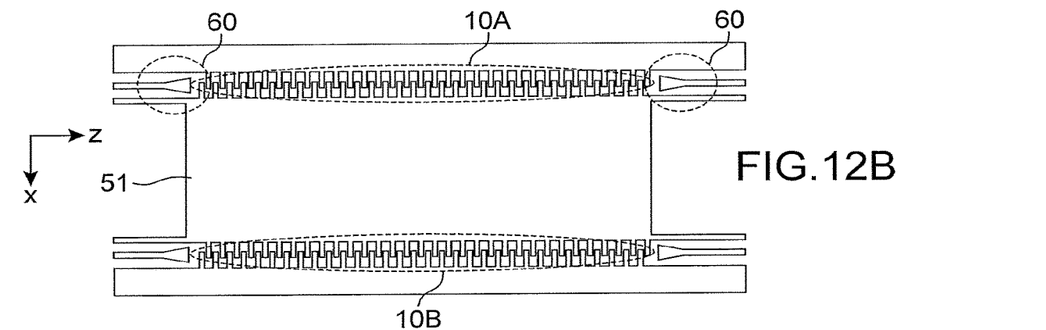
Figure 12C:
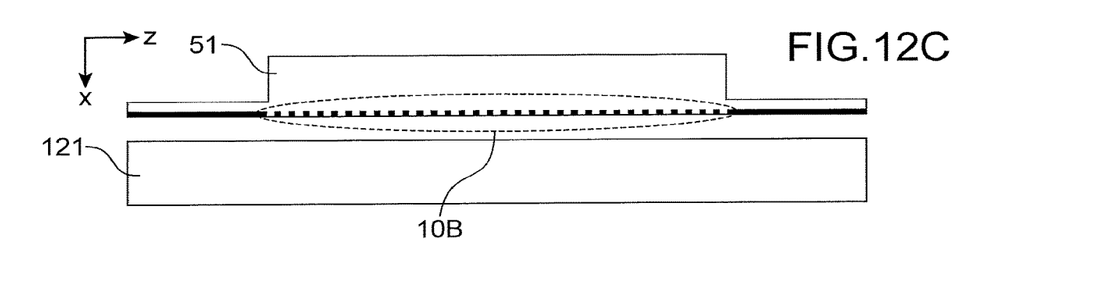

FIGS. 12A to 12C are perspective, top and side views respectively illustrating another example of an optomechanical system according to the invention, using an Mach-Zehnder interferometer. The figures are simplified by representing only the interferometer arms, without the separation and recombination elements. Such a system is adapted to form an accelerometer.

In this case, the optomechanical structure comprises two guide structures 10A, 10B, parallel to each other. Mode adapters 60 are placed at the input and output of each of the two guide structures 10A, 10B respectively (shown diagrammatically only).

The mobile beams of each of the two guide structures 10A, 10B are mounted fixed to the same rigid plate 51 which is suspended above the substrate 121.

The rigid plate 51 is free to move in translation along the (Ox) axis.

Movement of the rigid plate 51 results in simultaneous translation of mobile beams of the guide structure 10A and mobile beams of the guide structure 10B.

In particular, a displacement $\Delta x$ of the rigid plate results in an increase of $\Delta x$ in the width W of the nesting region of the first guide structure 10A, and a reduction of $\Delta x$ in the width W of the nesting region of second guide structure 10B. In other words, the width W of the nesting region varies in an opposite manner in the first guide structure 10A and in the second guide structure 10B. It is thus possible to make a differential measurement of the phase shift, to be independent of any phase shifts not directly related to $\Delta x$.

For example, the rigid plate 51 is made of silicon with a height of 50 µm (dimension along (Oy)), a length of 300 µm (dimension along (Oz)), and a width of 300 µm (dimension along (Ox)). The dimensions of each guide structure are identical to the dimensions of the example in FIG. 8A. Waveguide segments located upstream and downstream from each guide structure are made of silicon, and they have a section of 500 µm×200 µm.

The result obtained is a limit to detection of accelerations of the order of about ten µg, or even one µg, if the interferometer is placed under a vacuum. Even much better performances can be obtained particularly by optimising the sizing of the rigid plate 51 and its support arms.

The optomechanical system according to the invention forms part of the technical field of optomechanical movement sensors integrated into a photonics on-chip circuit. It may be integrated into a photonic chip and benefits from all the advantages related to this technology (low cost, compactness, efficiency, etc.).

In particular, it can be used for displacement measurements exceeding 50 nm, when non-linear effects upset the measurement starting from 20 nm, in prior art.

There is no theoretical limit to the smallest measurable displacements, since the observed effects can be amplified by increasing a propagation length in the guide structure, possibly by placement in a resonant cavity.

It can be coupled to a large number of mechanical oscillators, which enables application in many fields. It is used particularly for applications in the following fields:
  inertial measurement (the system can form an accelerometer, a gyrometer, etc.);
  fluid measurement (measurement of the movement of a fluid, measurement of a viscosity, etc.);

biosensors (for example by fixing antibodies on mobile beams, on which target molecules can be grafted);

photo-acoustic (the acoustic pressure wave being capable of moving an element fixed to the mobile beams); etc.

The optomechanical system according to the invention can be made from an SOI (silicon on insulator) stack, comprising a thin silicon layer and thick silicon dioxide layer superposed.

The thin silicon layer is etched over its entire thickness to form the guide structure, the mode adapters if any, the waveguide segments and if applicable elements dedicated to the suspension and movement of mobile beams. Etching may be done by lithography, using a hard mask.

The thick layer of silicon dioxide is etched locally to make the suspension of suspended beams, and possibly of other elements such as mode adapters, elements fixed to mobile beams, etc. Etching may be done by hydrofluoric acid etching.

The invention is not limited to the examples detailed above, and many other examples can be used without going outside the framework of the invention.

For example, the at least one mobile beam can be mobile along an (Oy) axis (dimension of the height of the beams), orthogonal to its longitudinal axis and also to the long axis of the guide structure. Displacement of at least one mobile beam then modifies the height of the core of the equivalent waveguide, which can also translate a beam displacement into an optical phase shift.

The at least one mobile beam can also be free to move along an axis orthogonal to the long axis of the guide structure, with a component along the (Ox) axis (longitudinal axis of the beams) and a component along the (Oy) axis (height axis of the beams).

Displacement of the at least one mobile beam then modifies the height and the width of the core of the equivalent waveguide.

All beams do not have necessarily the same dimensions.

In particular, at least one beam may be longer than the others (dimension along the (Ox) axis), to facilitate its movement. It then forms a mobile beam in the meaning of the invention. Preferably, in each series of beams, the beam ends located on the side of the nesting region are aligned with each other along an axis parallel to the (Oz) axis (long axis of the guide structure). In this case, the at least one longer beam projects on the side opposite the nesting region.

Some beams can be thicker than others (dimension along the (Oz) axis).

In the above examples, all the beams in each comb are held rigidly fixed together. As an alternative, only some beams in each comb are fixed to a mobile element. Each comb can then comprise both mobile beams and fixed beams. For example, it comprises a set of mobile beams, located between two sets of fixed beams.

According to another example, the two series of beams can be offset from each other along both the (Ox) axis and the (Oy) axis.

According to another example, the beams may have non-plane faces.

The optomechanical system according to the invention may comprise several guide structures oriented along different axes to make multi-axis measurements.

Waveguide segments may have surface coupling gratings, to make optical coupling between a nanophotonic circuit containing the optomechanical system according to the invention and the exterior of the circuit (for example an optical fibre).

The invention claimed is:

1. An optomechanical system for transduction of a displacement into an optical phase shift, comprising:
    at least one guide structure, adapted to guiding a light beam centered on a predetermined wavelength called the guided wavelength; and
    at least two waveguide segments, each arranged to carry a light beam as far as the at least one guide structure, or to move a light beam emerging from the at least one guide structure to a distance,
    wherein:
    the at least one guide structure comprises a plurality of beams parallel to each other, distributed one after the other along a long axis of the guide structure, and arranged in two combs partly nested one in the other; and
    at least one beam of the plurality of beams is mobile, free to move in translation relative to other ones of the plurality of beams of the guide structure along an axis orthogonal to the long axis of the guide structure.

2. The optomechanical system according to claim 1, wherein the beams of the guide structure together form a periodic structure in a nesting region of the beams between them, with an elementary pattern with dimension Λ along the long axis of the guide structure, with:

$$2\pi\Lambda < \frac{\lambda}{n_{\text{eff}}}$$

wherein λ is the guided wavelength, and $n_{\text{eff}}$ is the effective index of guided mode in the guide structure.

3. The optomechanical system according to claim 1, wherein at least one beam is free to move in translation along its longitudinal axis.

4. The optomechanical system according to claim 1, wherein the beams of the two combs are distributed alternatingly along the long axis of the guide structure.

5. The optomechanical system according to claim 1, comprising an optical resonator, within which the guide structure is located.

6. The optomechanical system according to claim 5, wherein the optical resonator is a linear cavity.

7. The optomechanical system according to claim 6, wherein the linear cavity comprises mirrors each being composed of a Bragg grating, each Bragg grating being formed by two sets of secondary beams distributed into two partially nested end combs.

8. The optomechanical system according to claim 5, wherein the optical resonator comprises a curved waveguide, arranged with the guide structure to guide light along a closed loop optical path.

9. The optomechanical system according to claim 1, comprising a Mach-Zehnder interferometer within which the guide structure is located.

10. The optomechanical system according to claim 9, wherein the guide structure is located in a first arm of the interferometer and in that a reference structure is located in a second arm of the interferometer, the reference structure being identical to the guide structure except that all the beams which compose the reference structure are fixed.

11. The optomechanical system according to claim 9, comprising two guide structures each located in one of the arms of the interferometer, and in that mobile beams of each of the two guide structures are fixed to each other.

12. The optomechanical system according to claim 1, comprising at least one mode adapter, each mode adapter being located at one end of a guide structure and comprising:
- a central region, with width decreasing with decreasing distance from the guide structure; and
- two lateral regions, with width increasing with decreasing distance from the guide structure, located on each side of the central region and each comprising a plurality of adaptation beams, parallel to the beams of the guide structure.

13. The optomechanical system according to claim 1, wherein at least one mobile beam of the guide structure comprises a beam that is fixed to a suspended support extending along the long axis of the guide structure.

14. The optomechanical system according to claim 1, wherein at least one mobile beam of the guide structure comprises a beam that is fixed to a mass suspended above a substrate.

* * * * *

UNITED STATES PATENT AND TRADEMARK OFFICE
CERTIFICATE OF CORRECTION

PATENT NO. : 10,788,687 B2  
APPLICATION NO. : 16/193609  
DATED : September 29, 2020  
INVENTOR(S) : Boris Taurel et al.

Page 1 of 1

It is certified that error appears in the above-identified patent and that said Letters Patent is hereby corrected as shown below:

On the Title Page

Item (73), the Assignee's name is incorrect. Item (73) should read:
-- (73) COMMISSARIAT A L'ENERGIE ATOMIQUE ET AUX ENERGIES ALTERNATIVES, Paris (FR) --

Signed and Sealed this  
Twelfth Day of January, 2021

Andrei Iancu  
*Director of the United States Patent and Trademark Office*